US011476738B2

United States Patent
Schmitt et al.

(10) Patent No.: US 11,476,738 B2
(45) Date of Patent: Oct. 18, 2022

(54) STATOR OF AN ELECTRICAL MACHINE, COMPRISING AN ARRANGEMENT FOR TEMPERATURE DETECTION, AND ELECTRICAL MACHINE COMPRISING SUCH A STATOR

(71) Applicant: ZF FRIEDRICHSHAFEN AG, Friedrichshafen (DE)

(72) Inventors: Daniel Schmitt, Bad Bocklet (DE); Christian Brückner, Rimpar (DE); Sebastian Baumgart, Burkardroth (DE); Klaus Reuter, Oberthulba (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 104 days.

(21) Appl. No.: 17/058,842

(22) PCT Filed: May 22, 2019

(86) PCT No.: PCT/EP2019/063181
§ 371 (c)(1),
(2) Date: Nov. 25, 2020

(87) PCT Pub. No.: WO2019/228881
PCT Pub. Date: Dec. 5, 2019

(65) Prior Publication Data
US 2021/0211023 A1 Jul. 8, 2021

(30) Foreign Application Priority Data
May 28, 2018 (DE) .................... 10 2018 208 385.1

(51) Int. Cl.
*H02K 3/52* (2006.01)
*H02K 11/25* (2016.01)

(52) U.S. Cl.
CPC .................................. *H02K 11/25* (2016.01)

(58) Field of Classification Search
CPC .......... H02K 11/00; H02K 11/25; H02K 3/00; H02K 3/22; H02K 3/28; H02K 3/52; H02K 3/522; G01K 1/14
See application file for complete search history.

(56) References Cited

U.S. PATENT DOCUMENTS

2013/0270971 A1  10/2013  Dorner et al.
2013/0270973 A1  10/2013  Ikemoto
(Continued)

FOREIGN PATENT DOCUMENTS

DE         3229711      2/1984
DE      202007007391   10/2008
(Continued)

OTHER PUBLICATIONS

Office Action of the corresponding German Patent Application No. 10 2018 208 385.1.

*Primary Examiner* — Tran N Nguyen
(74) *Attorney, Agent, or Firm* — Cozen O'Connor

(57) ABSTRACT

A stator of an electric machine includes a stator winding having a plurality of coils, the coils are connected to one another by connection conductors. A temperature sensor is arranged at a connection conductor and is in thermal contact with the connection conductor for detecting a temperature. Two parallel current paths are formed at the connection conductor and the temperature sensor is arranged at one of the current paths.

16 Claims, 5 Drawing Sheets

(56) References Cited

U.S. PATENT DOCUMENTS

2014/0184031 A1     7/2014   Kaneshige
2016/0146860 A1*   5/2016   Futakuchi ............ G01R 15/205
                                                                                 324/105

FOREIGN PATENT DOCUMENTS

| | | |
|---|---|---|
| DE | 102016014160 | 5/2017 |
| EP | 0727864 | 8/1996 |
| EP | 2963778 | 1/2016 |
| EP | 2963786 | 1/2016 |
| EP | 2837085 | 8/2017 |
| JP | 4792884 | 10/2011 |
| JP | 2013121183 | 6/2013 |
| JP | 2015053814 | 3/2015 |
| JP | 2016129446 | 7/2016 |
| WO | WO 2014041265 | 3/2014 |
| WO | WO 2015040468 | 3/2015 |
| WO | WO 2016207537 | 12/2016 |
| WO | WO 2017090363 | 6/2017 |

* cited by examiner

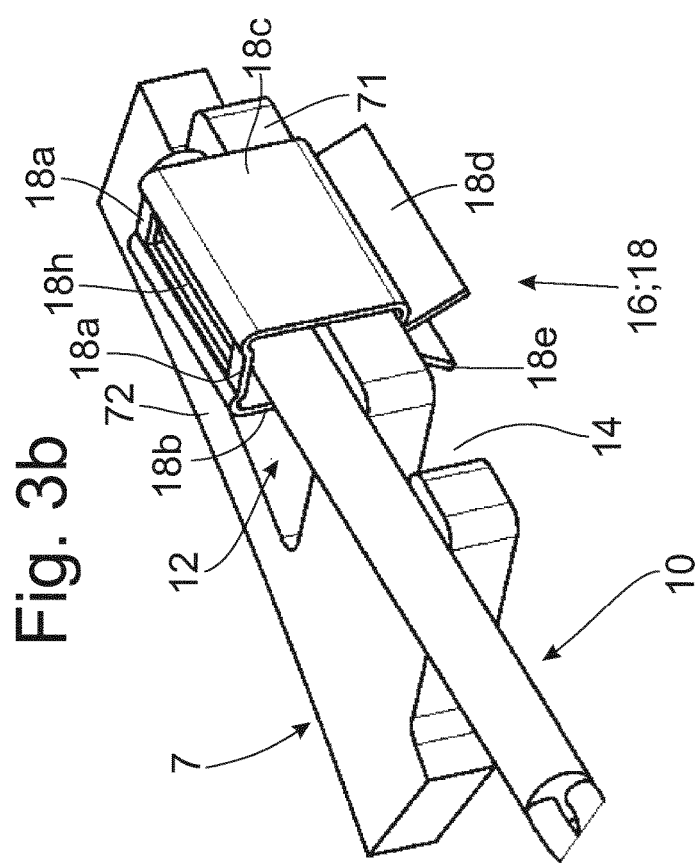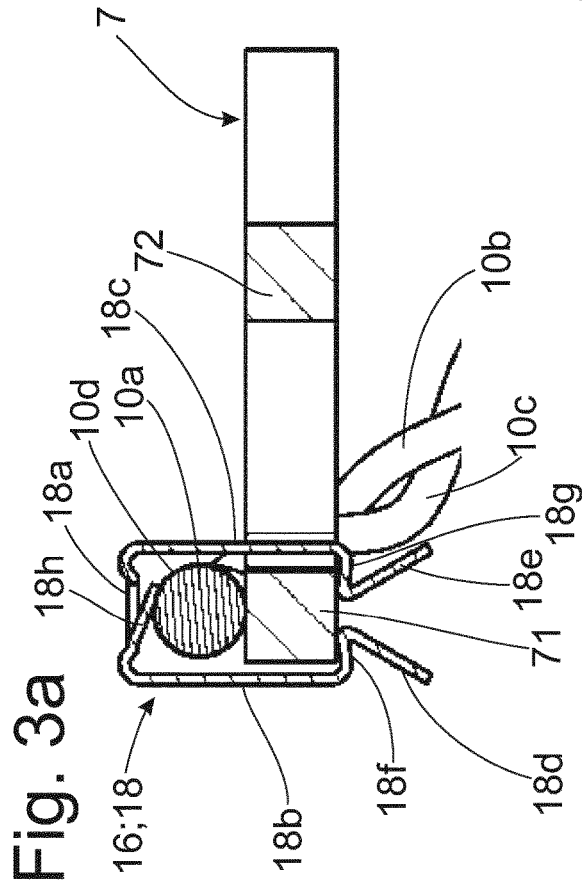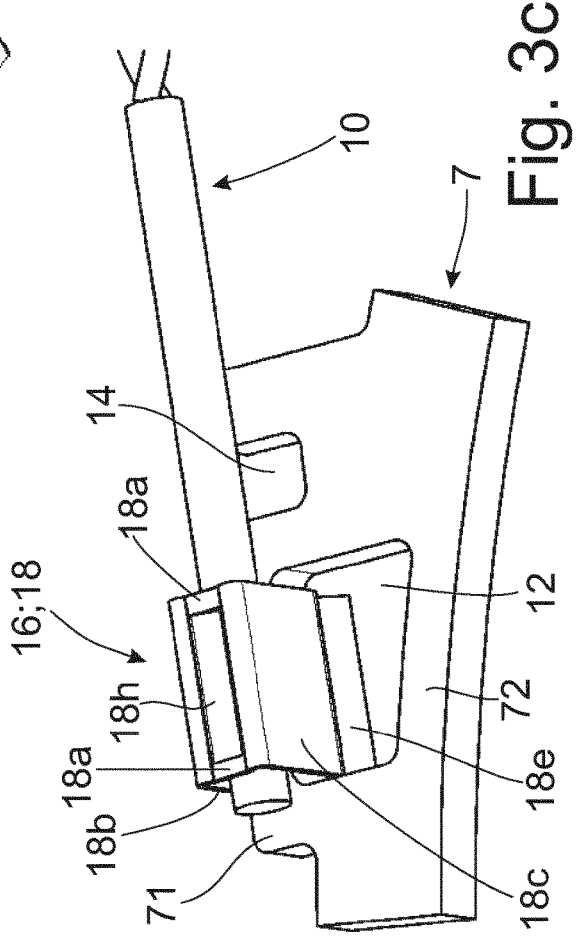

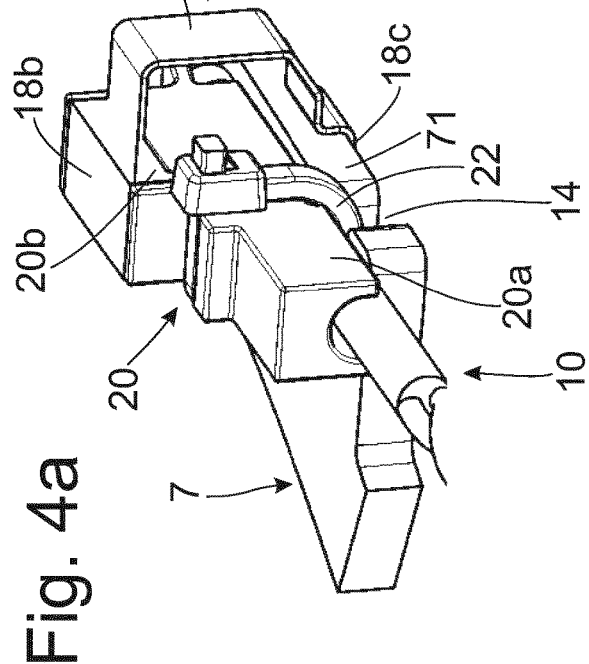
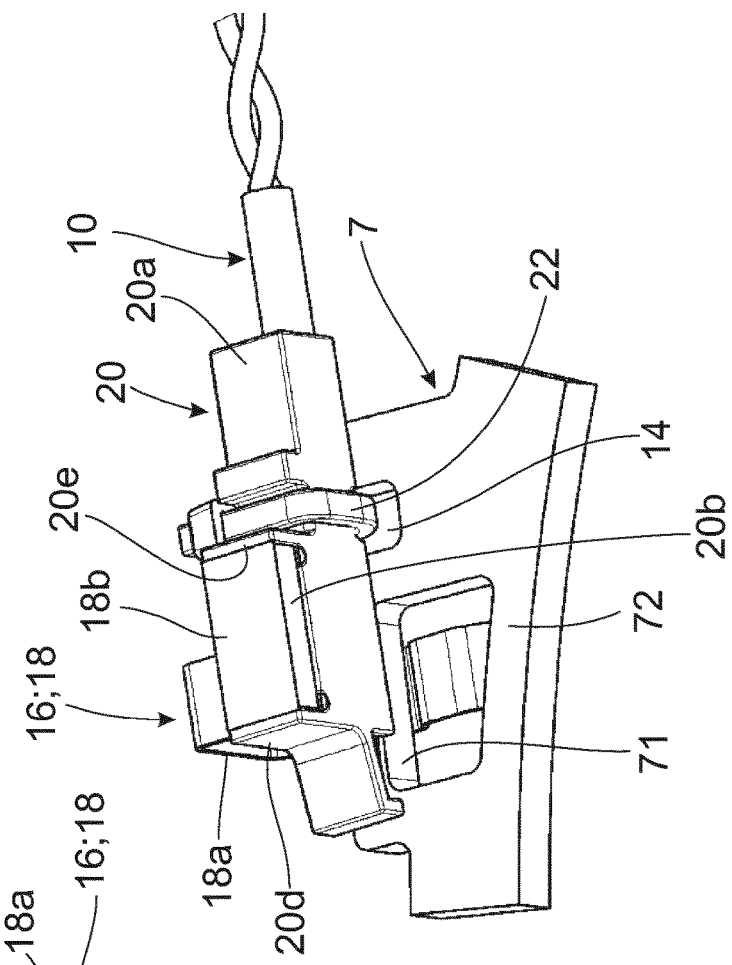
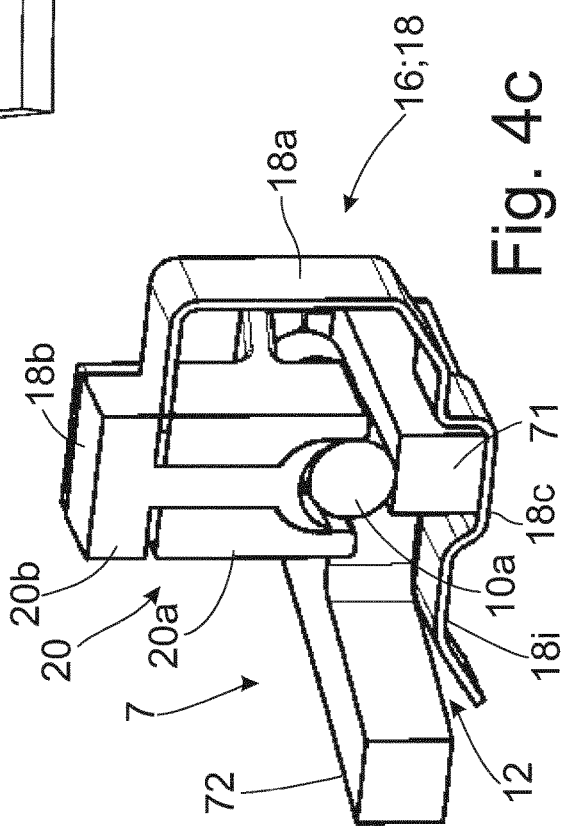

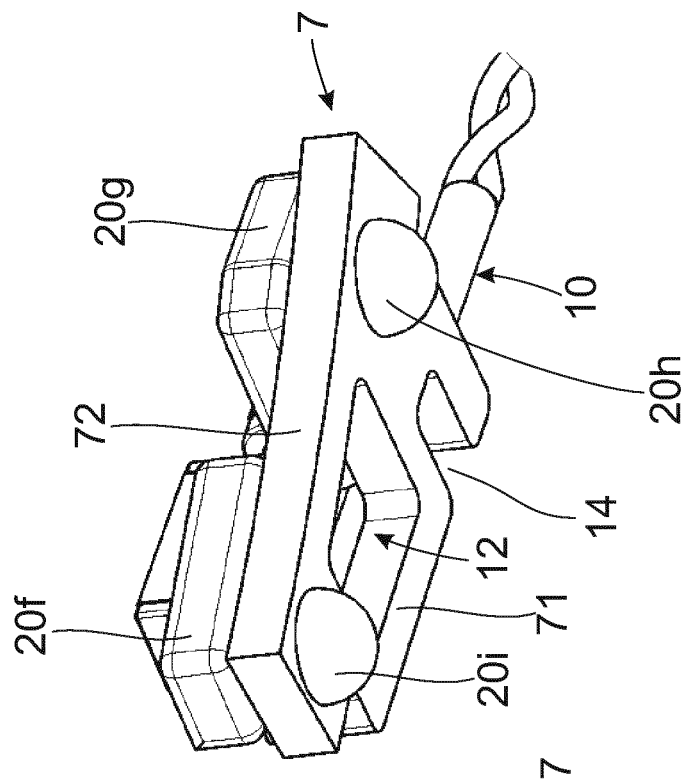

STATOR OF AN ELECTRICAL MACHINE, COMPRISING AN ARRANGEMENT FOR TEMPERATURE DETECTION, AND ELECTRICAL MACHINE COMPRISING SUCH A STATOR

CROSS REFERENCE TO RELATED APPLICATIONS

This is a U.S. national stage of Application No. PCT/EP2019/063181 filed May 22, 2019. Priority is claimed on German Application No. DE 10 2018 208 385.1 filed May 28, 2018 the content of which is incorporated herein by reference.

BACKGROUND OF THE INVENTION

1. Field of the Invention

The invention is directed to a stator of an electric machine with an arrangement for temperature detection and to an electric machine outfitted therewith.

2. Description of Related Art

For more reliable operation of an electric machine, it is known to arrange a temperature sensor at a winding system of the stator or at an interconnection device of the winding system for monitoring an operating temperature. In this way, the machine can be electrically controlled such that an overheating of a stator winding or an impermissibly high temperature of a magnet arrangement of the rotor can be prevented and the machine can operate in a thermally stable manner.

JP 4792884 B2 discloses an electric machine with a stator at which a winding in the form of single tooth coils is constructed. The coil ends are electrically connected to an interconnection device formed as a support plate that is held at a front side of the stator and axially adjacent to the coils by a cover. A spatial area is formed between the support plate of the interconnection device and the coils, in which spatial area a temperature sensor is clamped and contacts the coil winding adjacent to it for detecting an operating temperature of the stator winding system.

In the electric machine known from the generic EP 2 837 085 B1, the ends of stator windings are connected in a predetermined manner to a plurality of connection conductors arranged at the front side of the stator inside of an approximately annular disk-shaped plastic support element and together form an interconnection device. Slots into which terminal lugs of the sensor are inserted and can be electrically connected on the side facing the stator by soldering to paths provided at the latter are incorporated in a radially outer area of the support element for the arrangement of a temperature sensor. The sensor itself is guided around an outer edge of the interconnection device by a deformation of the terminal lugs and, at the side remote of the stator, is inserted and positioned in abutting contact with a connection conductor inside of a recess. Further, the sensor is acted upon by a pressing force in direction of the connection conductor by the action of a cover element attachable to the support element in order to produce a secure thermal contact with the connection conductor.

JP 2015 053 814 A likewise describes an electric machine with a stator winding and with an associated interconnection device that likewise comprises connection conductors arranged in a plastic support element. A temperature sensor is fastened to the above-mentioned support element by an elastically deformable holder. The sensor head of the temperature sensor contacts a conductor element of the stator winding in a heat-transmitting manner for sensing a temperature of the electric machine.

Further, US 2013/0270973 A1, which is also associated with the generic part of the preamble, discloses an electric machine with a stator winding, the coils of which are connected by a star connection. A temperature sensor is arranged at a cantilevered neutral conductor of the circuit which is located at the front side of the stator and which extends between two coil connection areas. For the arrangement of the temperature sensor, an area which is bent in a U-shaped manner and in which the temperature sensor and sensor head thereof are inserted is formed at the neutral conductor, and this area is overmolded with a plastic for permanently securing the sensor. The neutral conductor is formed over the entire length thereof with a cross section which corresponds to the cross section of a conductor element of a coil.

SUMMARY OF THE INVENTION

It is the object of one aspect of the invention to provide a generic stator of an electric machine with an improved arrangement for temperature detection. In particular, a temperature of the stator winding characterizing the state of the stator is to be detected with the arrangement. However, in doing so, encroachment into the winding system of the stator is to be prevented as far as possible and a temperature sensor can be installed in an easy-to-mount manner.

One aspect of the invention proposes a stator of an electric machine with a stator winding having a plurality of coils, wherein the coils are connected to one another by connection conductors. In this regard, a temperature sensor is arranged at a connection conductor and is in thermal contact with the connection conductor for sensing a temperature.

One aspect of the invention is characterized in that two parallel current paths are formed at the connection conductor, and the temperature sensor is arranged at one of the current paths, referred to hereinafter as sensor path.

By dividing the connection conductor into at least two current paths, an at least approximate reproduction of the thermal conditions of a selected conductor element or of a conductor portion of a coil of the stator can be carried out and, therefore, a characteristic temperature of the electric machine can be determined or derived. Accordingly, the sensor path for the arrangement of the temperature sensor can be thermally adapted to any desired other position at the stator or at the rotor by adjusting the conductor cross section and conductor length. It is not required to divide the connection conductor into two current paths along its entire extension. It is sufficient to divide the connection conductor into two current paths only in a partial area of the extension so that a portion of sufficient size is available for the arrangement of the temperature sensor and for sensing the characteristic temperature.

The temperature sensor can take the form of an NTC resistor, for example, and can have an overall rod-shaped configuration with a drop-shaped sensor head and with terminal lugs accommodated in an insulating tube or shrink tubing. It is advantageous when the two terminal lugs of the sensor run in a common direction and are constructed to be flexible. Other known types of construction are likewise possible. The connection conductors in the arrangement described above can be disposed at the front side of the stator and can be freely accessible from the side remote of the stator for mounting the sensor.

The connection conductors can be formed as busbars which, in a multiphase electric machine, are present for each phase and also for a neutral conductor depending on the type of interconnection. A connection conductor can be arranged along the entire extension thereof or at least in the contact area of the temperature sensor in a cantilevering manner between two connection areas, i.e., without being supported by a support element or, alternatively, received by a support element and supported by the latter.

A realistic workable measured quantity of the temperature sensor is achievable in that the two current paths are spatially separated by a recess and are formed so as to be spaced apart from one another. The recess is formed in such a way that there is essentially no mutual thermal interaction between the current paths acting as heat sources.

The conductor paths can be formed with the same length or with a different length. Effective cross sections of the current paths may be identical or may differ from one another; that is, the adjustment of the temperature occurring at the sensor path can also be carried out solely via the length of the current path with any given cross section of a connection conductor. On the other hand, with current paths of the same length, a different cross section can be formed at these current paths.

A defined critical operating temperature occurring at the electric machine can be mapped in particular by forming the sensor path in a defined manner. The defined critical operating temperature may be a temperature at which an unwanted or impermissible worsening of the efficiency of the electric machine occurs or a temperature at which, when exceeded, the electric machine can conceivably be destroyed. The adaptation can easily be performed via reference temperature measurements at the mounting location of the temperature sensor and at the required other position.

It is likewise advantageous, although not compulsory, for the adjustment of a desired current density and therefore for reproducing the thermal conditions that the connection conductor is formed from the same conductor material at least in a contact area of the temperature sensor and is formed substantially with the same conductor cross section as a conductor element of a coil of the stator winding.

Further, the connection conductor can advantageously have a larger conductor cross section in an area outside of the contact area of the temperature sensor than the conductor element of the coil. In order to create a greater current load capacity and to reduce the temperature occurring there, the connection conductors which connect the coils of a stator winding and which are in the form of phase connection conductors and possibly a neutral conductor can be formed with a cross section which is much larger than a conductor cross section of a coil or of a conductor element of a coil.

Optionally, for fastening the temperature sensor to the connection conductor, a fastening element can be provided which is supported at the connection conductor itself. A fastening of the sensor to a further element such as, for example, a support element of a connection conductor, can be dispensed with. Also, the component tolerances influencing the fastening of the sensor in a multiple-part arrangement of this kind do not apply. This results in a simple construction and a reliable fastening of the temperature sensor. The fastening element can be constructed, for example, as a kind of holding clamp from wire, sheet metal or a plastic.

Optionally, the fastening element can be formed for mounting at the connection conductor without the use of tools. A fastening element formed for mounting without the use of tools offers the advantage that the temperature sensor can be mounted on a connection conductor, for example, simply by attaching the fastening element. The sensor can be clamped in between the fastening element and the connection conductor. Further advantageously, an automated mounting can be carried out by this simplification. Further, the mounting of the sensor is possible after the coils and the connection conductors have been secured to the stator and soldered or welded together. The temperature sensor is accordingly protected against the influence of a process heat introduced during the welding or soldering of conductor elements of the stator winding and, therefore, against damage. Further, the temperature sensor can easily be exchanged in case of defects without requiring changes to the mounting position of the sensor head.

The temperature sensor is advantageously in preloaded contact at the connection conductor with the cooperation of the fastening element. A more reliable thermal contact is ensured by generating preloading, which brings about a good response characteristic of the sensor in connection with a contact surface of the sensor that is as large as possible and possibly through an additionally applied thermal paste or heat transfer medium. A cooperation of the fastening element for the arrangement of the temperature sensor means that the fastening element according to an advantageous configuration can either itself exert a preloading force and is elastically deformable for generating a preloading or that an elastic element supported at the fastening element is incorporated between the temperature sensor and the fastening element. The fastening element can have a springing-elastic portion acting on the temperature sensor for realizing the first variant.

In a particularly advantageous manner, the mutual connection of the fastening element and connection conductor can be formed as a snap-in connection or latching connection. To this end, the fastening element can have corresponding snap hooks or latch hooks which can engage at the connection conductor in edge areas and/or in a recess provided for this purpose. The connection can be formed in particular as a one-way latching connection for an even more reliable prevention of unintended detachment as a result of vibrations of the electric machine caused by operation.

The fastening element advantageously has a comparatively low thermal capacity relative to a sensor head of the temperature sensor and/or is thermally insulated at least to the greatest possible extent relative to the sensor head. The contact areas of the sensor with respect to the fastening element are advantageously minimized as well.

According to one aspect of the invention, the temperature sensor can have a housing made from a plastic that forms the fastening element itself or which cooperates with the fastening element. The temperature sensor can form a prefabricated unit with its housing and is accordingly more easily and reliably manageable for manual or mechanical assembly. Further, surfaces defined by the housing can be provided for engaging the connection conductor and possibly for engaging a separate fastening element.

According to one aspect of the invention, the housing can have at least one further fastening element for securing to the connection conductor for the purpose of an improved arrangement. The further fastening element can be formed at the housing as a latching element or as a thermally deformable projection for support at the connection conductor.

Optionally, the housing can have a displaceable housing part acting on a sensor head and a housing part which is stationary relative to the latter. A fastening element cooperates with the displaceable housing part, and the further fastening element secures the stationary housing part to the connection conductor. Therefore, securely locating the temperature sensor at the connection conductor on the one hand and generating a preloading on the sensor at the mounting location thereof on the other hand can be functionally separated.

BRIEF DESCRIPTION OF THE DRAWINGS

The invention will be exemplified in the following referring to the accompanying drawings.

The drawings show:

FIGS. 3a-c are various views for the arrangement of the temperature sensor;

FIGS. 4a-c are various views for the arrangement of the temperature sensor; and

FIGS. 5a-c are various views for the arrangement of the temperature sensor.

DETAILED DESCRIPTION OF THE PRESENTLY PREFERRED EMBODIMENTS

Figure 1:
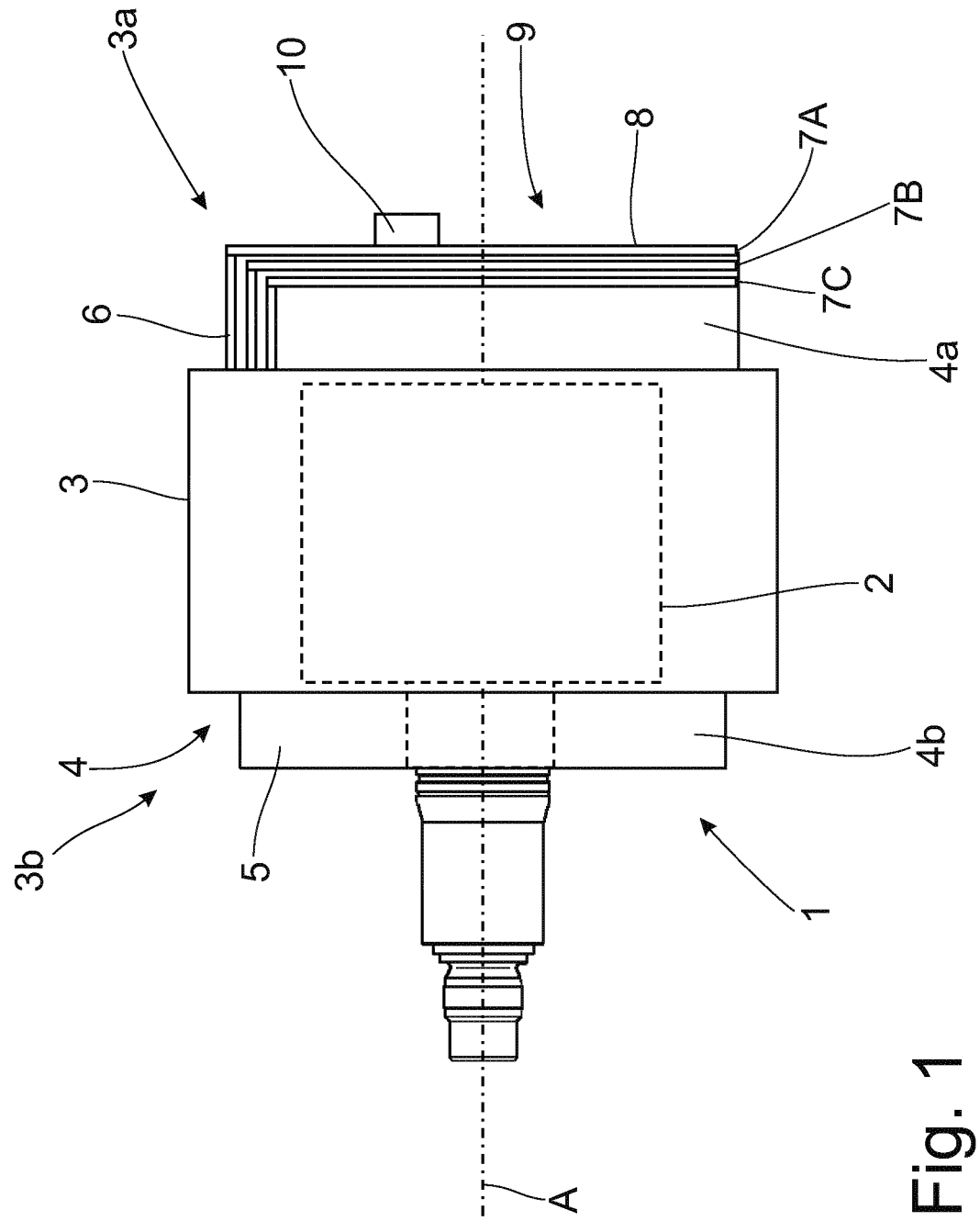
FIG. 1 is an overview of an electric machine with a temperature sensor.

A multiphase electric machine 1 with a rotor 2, which is rotatable around an axis A and with a stator 3, is only shown schematically in FIG. 1. The stator 3 has a stator winding 4 with a plurality of coils 5, not shown in detail, which can be formed, for example, as a concentrated winding with single tooth coils or as a bar winding, particularly as a hairpin winding using copper conductor elements 6, which are rectangular in cross section and hairpin-shaped. The conductor elements 6 of the winding 4 form winding heads 4a, b at the front sides 3a, 3b of the stator 3 and are guided out farther axially at the front side 3a and connected to one another there by a plurality of connection conductors 7A-7C. The connection conductors 7A-7C are likewise made of copper and in particular are formed as ribbon-shaped busbars 8 and function in the winding system of the stator 3 as phase conductors and possibly additionally as a neutral conductor. The connection conductors 7A-7C are arranged at the stator 3 so as to be radially or axially staggered and, in their entirety, form an interconnection device 9 of the stator winding 4 that extends in circumferential direction at least over a portion of the stator 3. For example, a temperature sensor 10 is arranged at the connection conductor 7A and is in thermal contact with the latter for sensing a temperature.

Figure 2A:
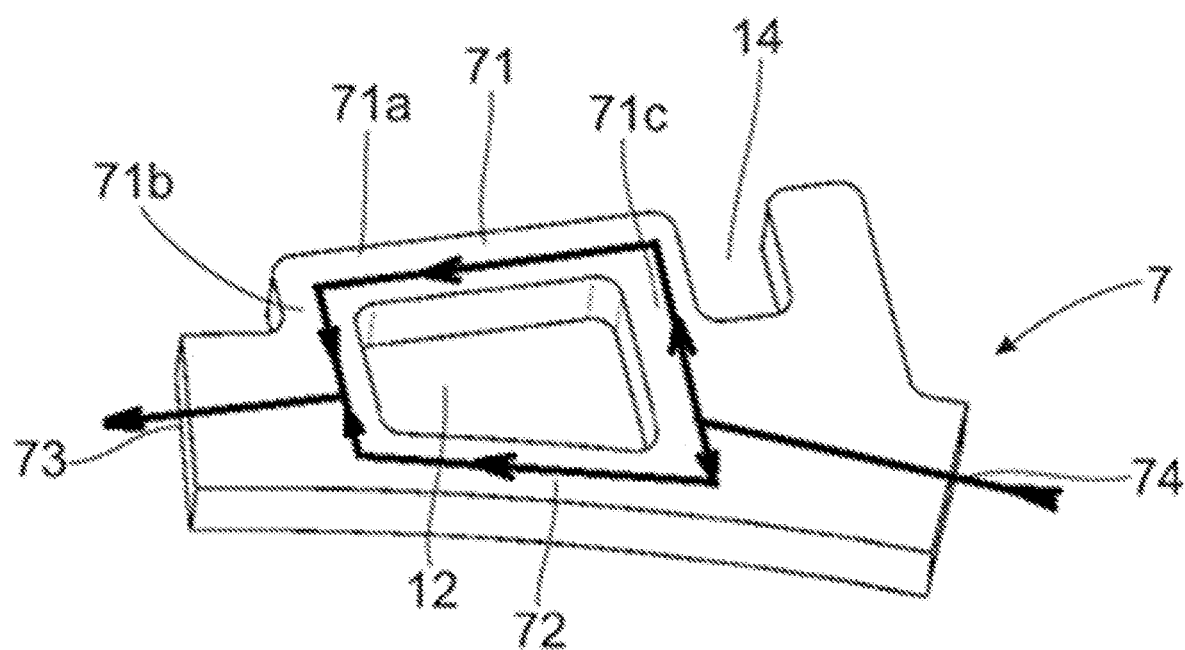
FIG. 2a is a partial view of a connection conductor of the stator of the electric machine formed for the arrangement of a temperature sensor.

The arrangement of the temperature sensor 10 is described in detail in the following referring to the embodiment examples shown in FIGS. 3-5, wherein FIG. 2a shows a section of a connection conductor 7 formed for this purpose. The temperature sensor 10 is formed in the present case as an NTC resistor and has an overall rod-shaped configuration with a drop-shaped sensor head 10a and with terminal lugs 10b, 10c accommodated in an insulation sleeve 10d in the form of thin-walled shrink tubing which is electrically insulated relative to the environment.

Referring to FIG. 2a, two electrically parallel current paths 71, 72 are formed for arranging the sensor 10 at the connection conductor 7. The temperature sensor 10 is arranged at current path 71, hereinafter sensor path 71. The connection conductor 7 is formed with a continuously uniform material thickness in the depicted area. The current paths 71, 72 are spatially separated by a first recess 12 and are formed so as to be spaced apart from one another. The recess 12 is formed in such a way that there is essentially no thermal interaction between the current paths 71, 72. The connection conductor 7 of the electric machine 1 is formed from the same conductor material as a conductor element 6 of a coil 5 of the stator winding 4. The connection conductor 7 has a larger conductor cross section in the areas 73, 74 adjoining the current paths 71, 72, i.e., outside of the contact area of the temperature sensor, than a conductor element 6 of the coil 5. In addition to the first recess 12 incorporated in the inner area of the connection conductor 7, a further, second recess 14 is provided at an outer area of the connection conductor 7. As is discernable from the figures, the sensor path 71 and the current path 72 do not extend geometrically parallel to one another in the present instance but rather form an angle, in particular an acute angle. Further, a main extension area 71a of the sensor path 71 and the current path 72 have a different length in comparison. In the present case, the entire sensor path 71 is formed with a greater length than the current path 72. The cross sections of the current paths 71, 72 are identical in construction.

By adjusting the length of the sensor path 71, the current density occurring in the latter and, therefore, the temperature occurring at this position can be selectively approximated relative to a characteristic temperature occurring away from this position and, in particular, in a winding area of the stator winding 4 or can be adapted in any way or derived therefrom. In addition to or as an alternative to the length adjustment, an adjustment of this kind can also be carried out by varying the cross section of the sensor path 71 and/or of the electrically parallel current path 72. Outside of the main extension area 71a are adjoining secondary extension areas 71b, 71c which are angled at both sides and are comparatively short. The shaping of the inner and outer contour of the connection conductor 7 in the area of the sensor arrangement can preferably be carried out by stamping. In all of the arrangements mentioned in the following, a fastening element 16 is provided for fastening the temperature sensor 10 to the connection conductor 7, which fastening element 16 is supported at the connection conductor 7 and is formed for mounting at the connection conductor 7 without the use of tools.

In all of the depicted embodiment examples, the rod-shaped temperature sensor 10 contacts the main extension area 71a of the sensor path 71 by its main extension direction. A clamp 18 which is bent from a flexible sheet metal material, particularly a spring steel, is provided as fastening element 16. The fastening element 16 has a comparatively low thermal capacity compared to the sensor head 10 and/or is thermally insulated, at least to the greatest possible extent, relative to the sensor head 10.

In a first embodiment example according to FIGS. 3a-c, the clamp 18 engages over the sensor path 71 with two arms 18b, 18c coming from the sensor 10 proceeding from a common connection area 18a. The arms 18b, 18c have, in their end areas, insertion portions 18d, 18e which face away from one another and together form an insertion area for the sensor 10.

The arms 10b, 10c are shaped in such a way that they can automatically spread apart elastically during the mounting of the clamp 18 when the sensor 10 is inserted into the insertion area owing to a feeding movement from the direction of the temperature sensor 10 so that the clamp 18 can easily be pushed over the sensor 10 and the sensor path 71. When the predetermined mounting position has been reached, the arms 18b, 18c can engage around the sensor path 71 on the back side thereof by means of inwardly directed holding portions 18f, 18g and snap back into their parallel initial position. The mutual connection of the fastening element 16 and connection conductor 7 is formed as a snap-in connection or latching connection. The temperature sensor 10 is accordingly clamped in between the connection area 18a and the sensor path 71, the latter being pressed against the sensor path 71 with preloading by a spring portion 18h arranged at the connection area 18.

According to a second example shown in FIGS. 4a-c, the temperature sensor 10 has a housing 20 made of a plastic, in particular a thermoplastic. The housing 20 is open at the side directed toward the sensor path 71 so that the sensor 10 can be inserted or pushed into the housing 20 and so that the sensor head 10a can contact the housing 20 and the sensor path 71. The housing 20 is formed of two parts. A housing part 20b which is displaceable in direction of the sensor path 71 and which can press against the sensor head 10a in direction of the sensor path 71 under the influence of a preloading force is guided in a stationary housing part 20a. The preloading force is in turn generated by a resilient fastening element 16 constructed as a clamp 18. In the present example, the clamp 18 is arranged with its connection area 18a rotated by 90° relative to the example in FIG. 3 and can accordingly be fed in and mounted laterally, i.e., in the plane of the connection conductor 7. When mounting, an arm 18b engages at a portion of the movable housing part 20b protruding from housing part 20a and is held and guided in this position by two lateral wall portions 20d, 20e. A second arm 18c which is arranged substantially parallel to the first arm engages at the side of the current path 71 remote of the sensor head 10a and can engage behind the current path 71 with a holding portion 18i when snapping in and can snap into the recess 12. The connection of the housing part 20a to the prefabricated sensor 10 is detachable and is realized, for example, by means of a connection element 22, in the present case a cable connector. A non-detachable connection is also possible in this case by means of gluing or by forming as an injection molded part or the like.

Figure 2B:
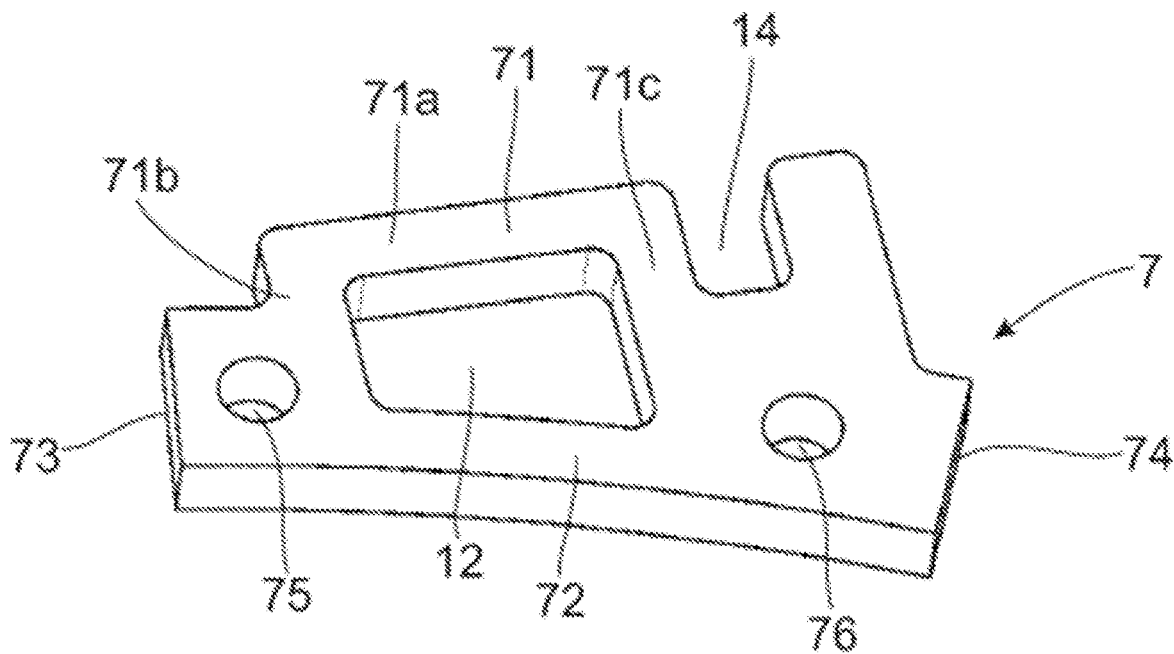
FIG. 2b is the connection conductor of FIG. 2a with fastening openings.

FIGS. 5a-c show an example for the arrangement of a temperature sensor 10 at a connection conductor 7. The example is based on the example in FIGS. 4a-c, wherein the stationary housing part 20a has been expanded by two portions 20f, 20g which protrude laterally from the latter in the plane of the connection conductor 7 and form further fastening elements for securing the temperature sensor 10 to the connection conductor 7. Pin-shaped or rivet-shaped projections 20h, 20i which can penetrate fastening openings 75, 76 of the connection conductor 7 shown in FIG. 2b proceed from these portions 20f, 20g. The housing 20 is produced, at least with the stationary portion 20a thereof, from a thermoplastic material so that the projections 20h, 20i can be thermally deformed into rivet heads and so as to secure the housing part 20a to the connection conductor 7. The clamp 18 acts in the manner described referring to FIG. 4 on the sensor head 10a via the movable housing part 20b. For the sake of clarity, the clamp 18 is not depicted in FIGS. 5b, c. The prefabricated rod-shaped sensor 10 can accordingly be inserted or pushed into the stationary housing part 20a and engaged with the connection conductor 7 accompanied by preloading through the arrangement of the clamp 18 by means of the movable housing part 20b. Alternatively, the fastening element or fastening elements 20h, 20i of the housing 20 can also be formed, for example, as a latching element or snap-in element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A stator of an electric machine with an arrangement for temperature detection, comprising:
   connection conductors, at least one of the connection conductors having two parallel current paths;
   a stator winding having a plurality of coils that are connected to one another by the connection conductors; and
   a temperature sensor is arranged the at one of the connection conductors and is in thermal contact with the one of the connection conductors for detecting a temperature,
   wherein the temperature sensor is arranged at one of the two parallel current paths.

2. The stator according to claim 1,
   wherein the two parallel current paths are spatially separated by a recess and are formed so as to be spaced apart from one another, and
   wherein the recess is formed such that there is essentially no mutual thermal interaction between the two parallel current paths.

3. The stator according to claim 1, wherein the two parallel current paths are each formed with a different length.

4. The stator according to claim 1, wherein the two parallel current paths are each formed with a different cross section.

5. The stator according to claim 1, wherein the one of the two parallel current paths is formed such that a defined critical operating temperature of the electric machine is mapped and detected.

6. The stator according to claim 1, wherein the one of the connection conductors is formed at least in a contact area of the temperature sensor from a same conductor material and substantially a same conductor cross section as a respective conductor element of a respective coil of the stator winding.

7. The stator according to claim 6, wherein the one of the connection conductors has a larger conductor cross section than the respective conductor element of the respective coil in an area outside of the contact area of the temperature sensor.

8. A stator of an electric machine with an arrangement for temperature detection, comprising:
   connection conductors, at least one of the connection conductors having two parallel current paths;

a stator winding having a plurality of coils that are connected to one another by the connection conductors; and a temperature sensor is arranged the at one of the connection conductors and is in thermal contact with the one of the connection conductors for detecting a temperature, wherein the temperature sensor is arranged at one of the two parallel current paths, wherein a fastening element, which is supported at the one of the connection conductors, is provided for fastening the temperature sensor to the one of the connection conductors.

9. The stator according to claim 8, wherein the fastening element is configured to mount at the one of the connection conductors without the use of tools.

10. The stator according to claim 8, wherein the temperature sensor is in preloaded contact at the one of the connection conductors with the cooperation of the fastening element.

11. The stator according to claim 8, wherein the fastening element is elastically deformable for generating a preloading.

12. The stator according to claim 8, wherein a mutual connection of the fastening element and the one of the connection conductors is formed as a snap-in connection or a latching connection.

13. The stator according to claim 8, wherein the fastening element has a comparatively low thermal capacity compared to a sensor head of the temperature sensor and/or is thermally insulated relative to the sensor head.

14. The stator according to claim 8, wherein the temperature sensor has a housing made from a plastic that forms the fastening element or which cooperates with the fastening element.

15. An electric machine comprising:
a rotor; and
a stator comprising:
connection conductors, at least one of the connection conductors having two parallel current paths;
a stator winding having a plurality of coils that are connected to one another by the connection conductors; and
a temperature sensor is arranged the at one of the connection conductors and is in thermal contact with the one of the connection conductors for detecting a temperature,
wherein the temperature sensor is arranged at one of the two parallel current paths.

16. The electric machine according to claim 15, wherein a fastening element, which is supported at the one of the connection conductors, is provided for fastening the temperature sensor to the one of the connection conductors.

* * * * *